Aug. 18, 1925.

F. W. DANE 1,549,748

BATTERY

Filed Nov. 18, 1921    2 Sheets-Sheet 1

Inventor:
Francis W. Dane,
by Emery Booth Janney + Varney
Attys.

Aug. 18, 1925.  1,549,748
F. W. DANE
BATTERY
Filed Nov. 18, 1921   2 Sheets-Sheet 2

Inventor:
Francis W. Dane,
by Emery Booth Janney Varney
Attys.

Patented Aug. 18, 1925.

1,549,748

UNITED STATES PATENT OFFICE.

FRANCIS W. DANE, OF HAMILTON, MASSACHUSETTS, ASSIGNOR TO LUTHY STORAGE BATTERY CORPORATION, OF BOSTON, MASSACHUSETTS, A CORPORATION OF MAINE.

BATTERY.

Application filed November 18, 1921. Serial No. 516,179.

*To all whom it may concern:*

Be it known that I, FRANCIS W. DANE, a citizen of the United States, and a resident of Hamilton, in the county of Essex and State of Massachusetts, have invented an Improvement in Batteries, of which the following description, in connection with the accompanying drawings, is a specification, like characters on the drawings representing like parts.

This invention pertains to improvements in batteries, and more particularly, though not exclusively, to improvements in separators for storage batteries.

It is among the objects of my invention to provide a battery of great efficiency and long life.

In the drawings, which show a preferred form of one embodiment of my invention:—

Figure 1:
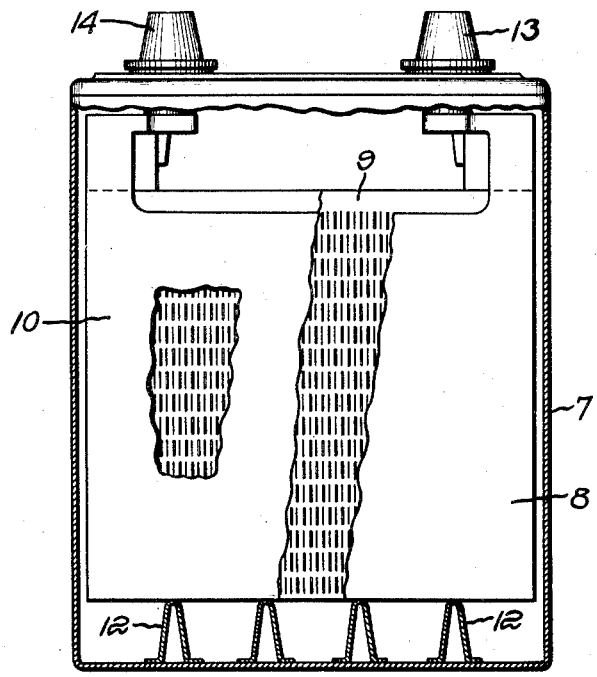
Figure 1 is an end elevation of a storage battery, the cell-case partly broken away to show an adjacent plate, which is in turn partly broken away to show a separator, the latter in turn partly broken away to show a second plate of opposite polarity and the second plate partly broken away to show a second separator.

Referring to Figures 1 through 4 of the drawings and to the preferred form of my invention selected for illustrative purposes, I have shown a battery including the cell-case 7, the end plate 8, the adjacent separator 9, a second plate 10 of opposite polarity from the plate 8 and a second separator, all preferably supported away from the bottom of the cell-case by suitable supporting means typified by the supports 12, which may be of celluloid or other suitable material. The general relative arrangement of plates and separators may be as is usual in storage batteries, the plates of one polarity being connected to a terminal 13 and the plates of the opposite polarity being connected to a second terminal 14.

The plates may be composed of or coated with suitable active materials following standard practice.

There is a tendency for the plates to become short-circuited because of bridging of loose active or other material between them, and separators are ordinarily provided with a view to preventing short-circuiting from this and other causes between adjacent plates. Such separators may be roughly subdivided into two classes, those in which material providing great numbers of pores, such as wood or "threaded rubber," are used, and those of more or less impervious material in which defined openings are provided. In the latter class the openings are sometimes more or less covered as in the separator shown in United States Patent No. 1,339,853 to Luthy. The covering of the openings is designed to prevent bridging of the gap between adjacent plates of opposite polarity, the bridging ordinarily starting by the lodging of active material in the holes through the separator.

In the preferred form of my invention illustrated, separators of the class last mentioned are used, it being among the objects of my invention to provide an improved separator of this class.

To this end, I have shown separators 9 preferably formed of celluloid or other non-conductive and preferably impervious and resilient material presenting lateral openings through which the electrolyte may pass. I have found that by using such lateral openings, the tendency of the material to bridge is much lessened, even in a normally stationary battery, while in a battery which is much moved, such as one used in the automotive art, the lateral swish of the electrolyte when the car is in motion tends to wash the openings clear of loose active material.

Figure 2:
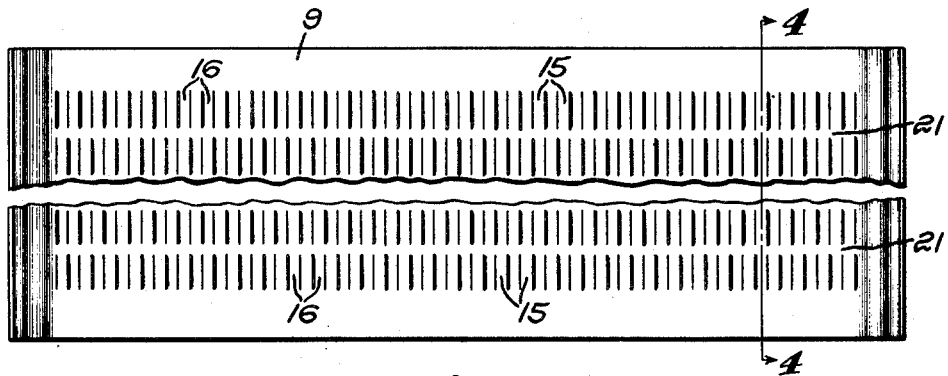
Fig. 2 is a side elevation of a preferred form of separator.
Figure 3:
Fig. 3 is a top view of the separator shown in Fig. 2.
Figure 4:
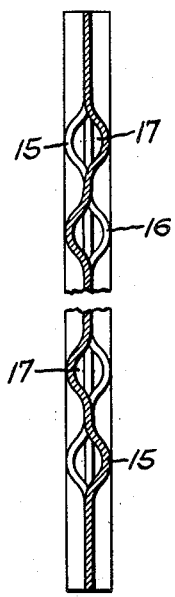
Fig. 4 is a section on the line 4—4 of Fig. 2, being partly in elevation and being on a larger scale.

In Figs. 2, 3 and 4 the preferred form of lateral openings 17 are provided by covering parts or hoods 15, 16 overlying the openings in the general plane of the separator, such covering parts preferably as illustrated alternating in direction both laterally and vertically of the separator as a whole and the top and bottom of each covering part connected to the portions of the separator lying in the general medial plane thereof.

The covering parts illustrated are preferably integral with the sheet of celluloid or other material from which the separator is made, preferably being pressed or otherwise distorted from a flat sheet, and might in some instances be made by molding from plastic material.

It is highly advantageous that the upper outside face of the covering parts 15, 16 be pitched at a sufficiently steep angle to tend to shed any loose active material lodging thereon. The formation of covering parts is also preferably such as to provide a certain amount of elasticity opposing resiliently any tendency from pressure of the plates to crush the separator and at the same time, where the separators are used in actual contact with the active material on the plate, resiliently holding the active material in place at a great number of points so that the active material is in a sense held in place.

Figure 5:
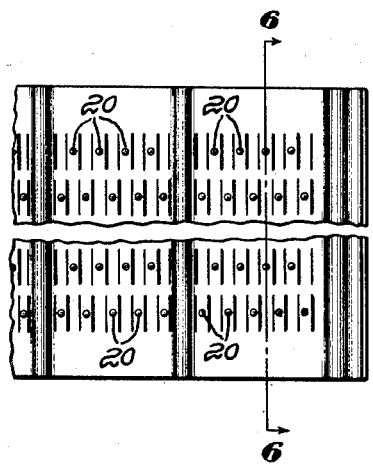
Fig. 5 is a side elevation of a modified form of separator.
Figure 6:
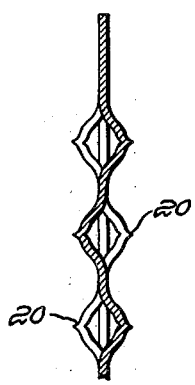
Fig. 6 is a section on the line 6—6 of Fig. 5, being partly in elevation and being on an enlarged scale.

In some instances it may be desired to provide support for the active material by lesser contacts, which may, if desired, be such as to penetrate somewhat the active material. In such cases the outer portions of the covering parts may be provided with raised bosses, typified by the points 20, 20 illustrated in Figs. 5 and 6. In such cases, greater freedom for flow of the electrolyte and for passage of any loose, active material to the bottom of the battery may be provided by properly spacing and proportioning the bosses.

The percentage of area open for passage of the electrolyte may be, where desired, very great where separators are made embodying my invention, and this while providing the necessary strength to the separator and while providing very satisfactorily against short-circuiting of adjacent plates by bridging or otherwise.

The separators may, if desired, be stiffened by suitable ribs or flanges extending vertically thereof, such flanges preferably terminating generally in the plane of the outer ends of the covering parts, as best shown in Fig. 3, and preferably combined to extend in opposite directions as in the S-section shown in the preferred form illustrated. The separator may be further strengthened, if desired, by one or more similar ribs appropriately located in the body, as distinguished from the edges of the separator. The height of these ribs may conveniently be used to determine the spacing of the cover parts 15, 16 from the active material on the plates, where supporting contact is for any reason not desired or necessary.

Horizontally the separator will ordinarily be sufficiently strong if unperforated portions be left at top and bottom thereof, and in the preferred form illustrated the intermediate transverse strips 21, of unperforated material, supply additional strength.

While I have shown and described a preferred form of my invention, it will be understood that major changes involving omission, addition, alteration, and substitution of parts, may be made without departing from the scope of my invention, which is best defined in the following claims.

Claims.

1. A battery comprising, in combination, positive and negative plates, an electrolyte, and a separator between said plates presenting laterally disposed apertures for passage of the electrolyte therethrough, said apertures underlying covering parts which, vertically considered, alternately project on opposite sides of the separator.

2. A battery comprising, in combination, positive and negative plates, an electrolyte, and a separator between said plates presenting laterally disposed apertures for passage of the electrolyte therethrough, said apertures underlying covering parts which, horizontally considered, alternately project on opposite sides of the separator.

3. A battery comprising, in combination, positive and negative plates, an electrolyte, and a separator between said plates presenting laterally disposed apertures for passage of the electrolyte therethrough, said apertures underlying covering parts which, both horizontally and vertically considered, alternately project on opposite sides of the separator.

4. A separator for batteries presenting a vertically slitted sheet having the material between the slits alternately disposed in opposite directions relative to the medial plane of the separator.

5. A separator for batteries presenting a plurality of openings therethrough, covering parts projecting toward opposite faces of the separator overlying adjacent openings, and stiffening means adjacent the lateral edges of the separator.

6. A separator for batteries presenting a plurality of openings therethrough, covering parts projecting toward opposite faces of the separator overlying adjacent openings, and S-shaped stiffening means adjacent the lateral edges of the separator.

7. A separator for batteries presenting an apertured sheet having stiffening means adjacent the lateral edges thereof, said stiffening means at each edge projecting in both directions from the general medial plane of the separator.

8. A separator for batteries presenting an apertured sheet having S-shaped stiffening ribs adjacent the lateral edges thereof.

9. A separator presenting a slitted sheet having portions between the slits projecting laterally from the general medial plane of the separator to present a wavelike vertical section.

10. A storage battery separator comprising a plate vertically slitted at regular intervals, the material of the plate between adjacent slits being pressed outwardly from the plate on opposite sides, whereby a large number of relatively small lateral openings are provided having hoods over the openings, each hood being connected at two opposite ends to the plate.

11. The separator as claimed in claim 10, wherein the hoods have a sufficiently steep slope to prevent any loose active material of the battery from lodging thereon.

12. The separator as claimed in claim 10, wherein the outer portions of the hoods are provided with outwardly extending bosses or points, said bosses or points providing support for the active material on the storage plate.

In testimony whereof, I have signed my name to this specification.

FRANCIS W. DANE.